United States Patent [19]

Garfinkle

[11] Patent Number: 5,124,510

[45] Date of Patent: Jun. 23, 1992

[54] TRACKING PANTOGRAPH FOR RAILWAY ELECTRIFICATION

[76] Inventor: Marvin Garfinkle, Post Office Box 15855, Philadelphia, Pa. 19103

[21] Appl. No.: 568,473

[22] Filed: Aug. 16, 1990

[51] Int. Cl.[5] .................................................. B60L 5/12
[52] U.S. Cl. ...................................... 191/65; 191/59.1
[58] Field of Search ....................... 191/50, 54, 55, 59, 191/59.1, 60, 60.1, 64, 65, 66, 68, 70, 72, 73, 78

[56] References Cited

U.S. PATENT DOCUMENTS

| | | | |
|---|---|---|---|
| 520,156 | 5/1894 | Brown | 191/65 |
| 740,577 | 10/1903 | Mackin | 191/65 |
| 931,292 | 8/1909 | Goldman | 191/64 X |
| 1,100,731 | 6/1914 | Hamilton | 191/65 |
| 1,152,707 | 9/1915 | Clark | 191/64 |
| 1,384,458 | 7/1921 | Fowler | 191/73 |
| 2,243,945 | 6/1941 | Drummey | 191/50 X |
| 2,935,576 | 5/1960 | Faiveley | 191/55 X |
| 3,830,990 | 8/1974 | Gray | 191/59.1 X |
| 3,924,084 | 12/1975 | Lindfors | 191/73 X |
| 4,603,237 | 7/1986 | Ling | 191/73 |

FOREIGN PATENT DOCUMENTS

| | | | |
|---|---|---|---|
| 0112265 | 6/1984 | European Pat. Off. | 191/65 |
| 0204888 | 12/1983 | Fed. Rep. of Germany | 191/65 |
| 3536843 | 4/1987 | Fed. Rep. of Germany | 191/59 |
| 0138904 | 5/1989 | Japan | 191/50 |
| 0099612 | 11/1961 | Netherlands | 191/65 |
| 0883773 | 12/1961 | United Kingdom | 191/65 |

Primary Examiner—Robert J. Spar
Assistant Examiner—Scott L. Lowe

[57] ABSTRACT

A pantograph apparatus for an electric locomotive is provided that possess two degrees of freedom, a vertical motion similar to that of the conventional pantograph apparatus and a unique lateral motion without any longitudinal component that permits the collector head to track an overhead conductor independently of the position of the overhead conductor relative to the track centerline. Tracking is accomplished electronically by two laterally-positioned contactors on the collector head that generate an error signal when contacted by the overhead conductor, thus actuating a servomechanism to reposition the collector head so as to maintain the overhead conductor between the lateral contactors. The pantograph apparatus disclosed herein is fully compatible with conventional catenary electrification.

7 Claims, 4 Drawing Sheets

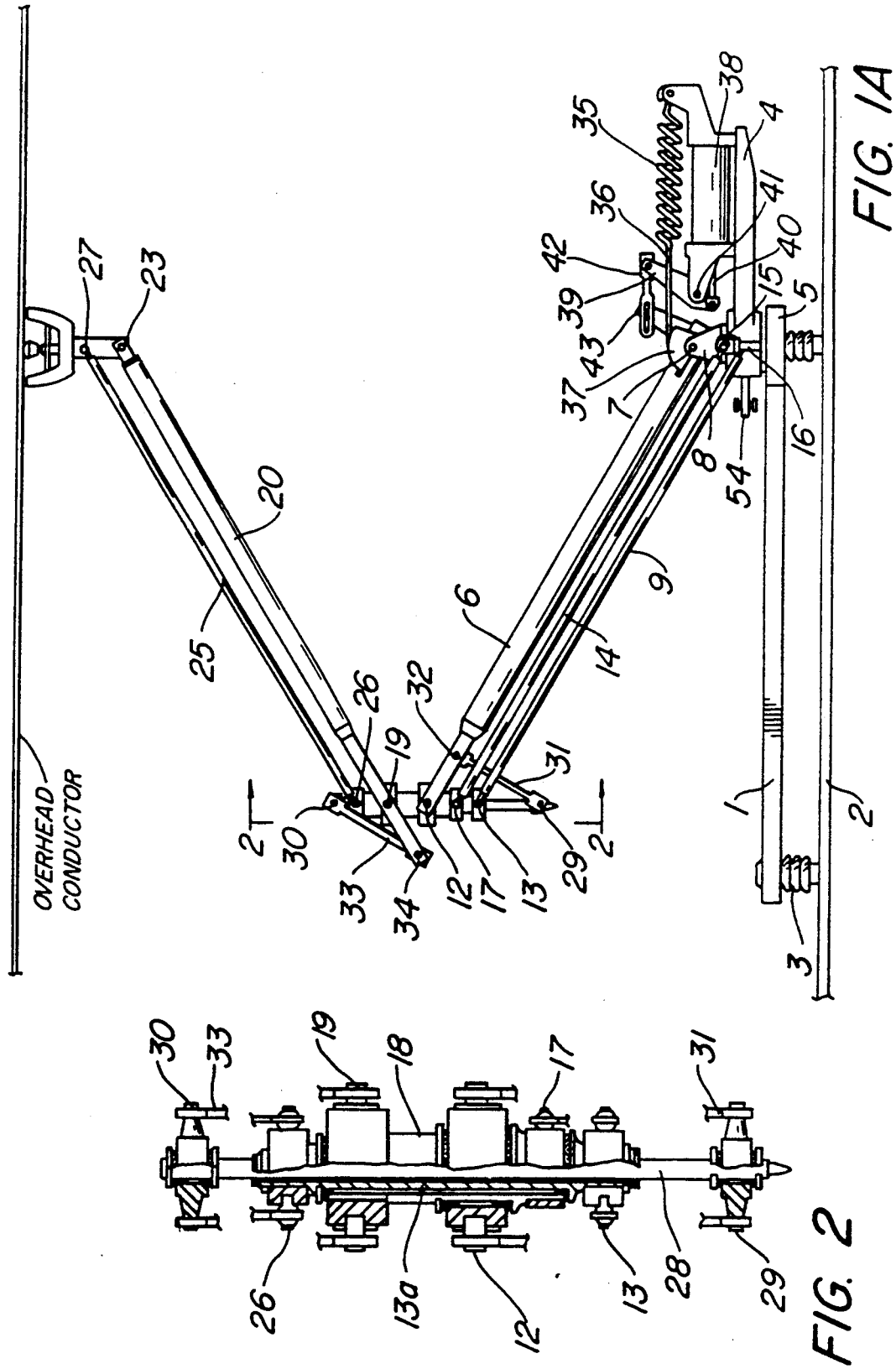

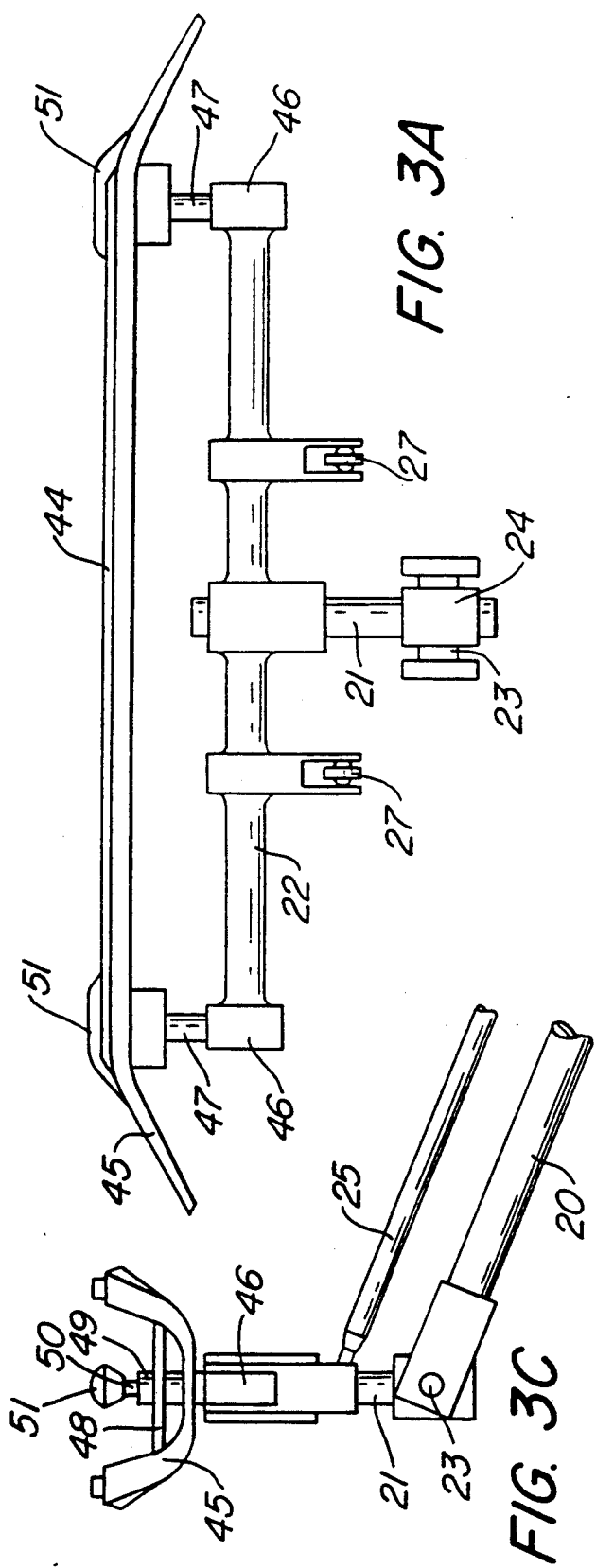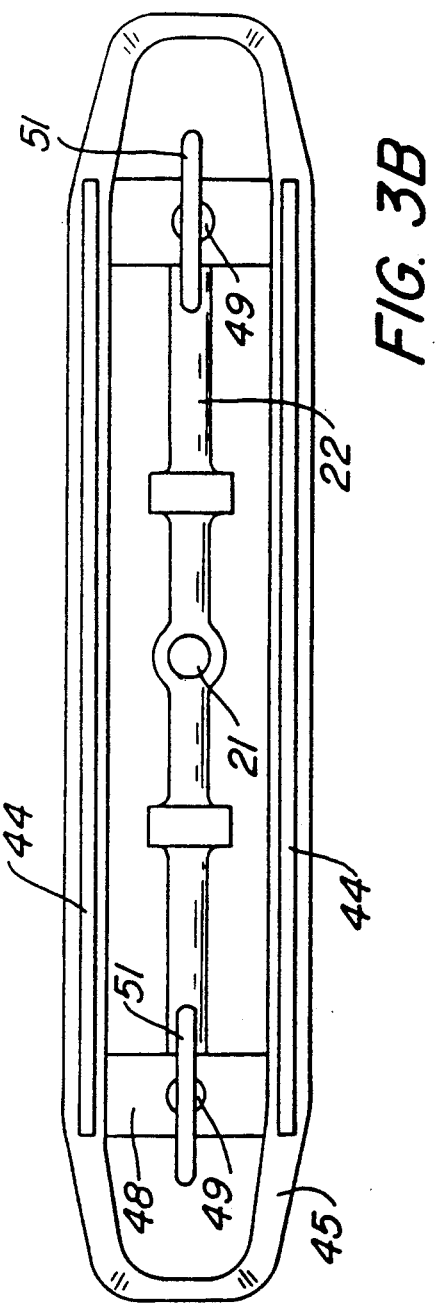

TRACKING PANTOGRAPH FOR RAILWAY ELECTRIFICATION

BACKGROUND OF THE INVENTION

The subject application is a substitute for prior application Ser. No. 07/135,576 which was, in turn, a continuation in part of prior application Ser. No. 06/853,134, both now abandoned.

With the notable exception of the United States, all of the world's industrialized nations have substantial portions of their railway trackage electrified, and these lines carry well over half of the world's railway traffic. In contrast, those portions of the trackage in the United States that are electrified are used almost exclusively for intercity and commuter traffic along narrow corridors.

With only 1800 km (1100 mi) of trackage electrified out of a total trackage of some 300,000 km (190,000 mi), virtually all freight haulage in the United States is conducted with diesel-electric locomotives. This includes coal haulage in unit trains over dedicated branchlines between mines and power stations. That is, railways constructed specifically to move coal from mine to power station rely almost exclusively on oil-fueled locomotives. Of all such branchlines in North America, only a handful use electric power to haul coal for the purpose of electric generation.

Considering that roughly one-third of the available coal-fired power generating capacity of the typical power district is unused for about two-thirds of the time and that roughly one-quarter of the available power is unused for about three-quarters of the time; this reliance on oil-fueled locomotives is all the more surprising in terms of this excess generating capacity until one considers the cost of overhead catenary electrification.

Electrification costs are so substantial that even when all of the advantages of catenary-electric traction over diesel-electric traction are taken into consideration for coal haulage, such as well over twice the locomotive service life with less than half the maintenance costs so that two catenary-electric locomotives can readily do the work of three diesel-electric locomotives, it is still not economically feasible to electrify existing coal-hauling lines by conventional means. This is the case despite the fact that for branchlines less than 100 km (62 mi) in length all of the electrical gear can be located at the power station with neither the need for substations nor the need to purchase, store or distribute diesel fuel.

Virtually all recent branchline electrification is confined to new railway construction involving the development of new coal fields and the construction of new power stations in which the cost of catenary electrification is a small portion of the overall cost of the project. For existing coal-haulage branchlines however, it is the substantial cost of conventional catenary construction that constitutes the only obstacle to electrification, despite the availability of excess power generating capacity. Nevertheless, the conventional catenary system is the only construction presently considered for branchline electrification.

The source of the high construction costs of conventional catenary construction is discussed herein, as are several schemes that have been proposed to ameliorate the disadvantages of conventional construction but which in fact introduces difficulties of their own, and these are compared with an alternate construction which utilizes the electronically-tracking pantograph.

OBJECTIVE OF THE INVENTION

The conventional catenary electrification system is used for heavy-traffic mainline operation and is useful for train speeds well above 100 kph (62 mph). The system is designed to maintain the location of the electrified overhead conductor (from which power is drawn) relative to the track centerline at an essentially fixed position. That is, the vertical and lateral position of the overhead conductor is specified within close limits.

To minimize sag between supports, the overhead conductor is suspended from hangers that are attached to a load-bearing messenger cable at close intervals. The messenger is fixed to cross-arms extending horizontally from support stanchions spaced alongside the track.

To minimize stagger, the spacing between stanchions must be limited or lateral support must be provided to keep the overhead conductor within specified lateral (stagger) tolerances. These tolerances are particularly critical along curved track.

Because the overhead conductor must closely follow the track centerline, particularly on curves, the catenary suspension system can be quite complex. Moreover, because of the heavy cantilever load of the cross-arms, cables and hangers, the support stanchions must be particularly well anchored. Obviously, catenary construction is altogether different from utility line construction.

To appreciate the complexities involved in conventional catenary construction consider a hypothetical 60 km (37 mi) branchline involving 12 km (7.5 mi) of curved track. For conventional catenary electrification a 70 m (230 ft) spacing between stanchions along tangent track are typical specifications with a 40 m (130 ft) spacing along curved track. The overhead conductor is supported by hangers at roughly 3 m (10 ft) intervals. Accordingly, roughly 1000 poles must be anchored and complex cross-arms installed before the overhead conductor is suspended from the messenger cable with 20,000 hangers of varying lengths secured by 40,000 clamps.

It is evident from this illustration that conventional catenary construction is highly labor-intensive. Moreover, when catenary systems are installed along operating lines, interruptions in catenary construction by train movements can easily double construction time and significantly increase construction costs.

However, it is precisely because conventional catenary construction does suspend the overhead conductor at essentially a fixed position above the track that a relatively simple power-collecting pantograph apparatus mounted on the roof of a locomotive can be used to draw power from the overhead catenary. The essential operational feature of the pantograph apparatus is that it is bidirectional. The apparatus functions properly in either direction of locomotive travel. The principal mechanical feature of this apparatus is that the upward load imposed by the collector head on the conductor is essentially independent of vertical displacement. This is relatively easily accomplished by a suitably insulated spring-loaded cam-linkage pantograph apparatus mounted on the locomotive.

Alternate schemes have been proposed to ameliorate the high cost of conventional catenary electrification, specifically for branchline operation that does not require the high-speed capability of conventional construction. However, the simpler the electrification system, the more complex must be the power-collecting apparatus. This relationship would be expected for as soon as the strict requirement is relaxed that the conductor occupy a fixed position above the track, then far simpler and significantly less expensive construction can be tolerated, such as single-wire construction without hangers. However, with the conductor meandering about the track centerline with varying stagger and sag requires that tracking means be incorporated into the power-collecting apparatus to maintain uninterrupted contact between the conductor and the collector head.

The simplest means of doing so is to abandon the pantograph apparatus altogether and substitute a trolley-pole apparatus. Such an apparatus employs as a collector a trolley wheel or V-groove slider that physically follows the overhead conductor by virtue of the upward force imposed by a spring-mounted trolley pole that supports the wheel or slider. However, such systems are susceptible to dewiring at abrupt changes in conductor direction at support points. Moreover, trolley-pole collectors are designed for unidirectional operation, with the collector trailing the pole. Such a restriction would be unacceptable in locomotive operation.

It is apparent from this description that the high costs associated with conventional catenary construction arises from the necessity of keeping the conductor at a fixed position relative to the track centerline. This invention relates to a pantograph apparatus capable of tracking a conductor not so strictly disposed. Without this strict positioning requirement, cheap utility-line construction techniques can be used in railway electrification.

The electronically-tracking pantograph apparatus disclosed herein is designed to alleviate the need for conventional catenary construction in branchline operation. This purpose is attained by fundamentally altering the geometry of the apparatus so that the power-collecting head tracks the overhead conductor independent of stagger or sag to achieve the following results:

a) tracking independent of any lateral loading on the conductor or on the collector head;

b) use of conventional crossed-contact conductors at turnouts without requirement for overhead switching devices; and c) absolute compatibility with the conventional catenary system.

The ordinary pantograph used with conventional catenary electrification has a single degree of freedom: It can maintain the vertical position of the collector head in contact with the conductor by swiveling the support arms the secure the collector head about laterally-oriented axes. Accordingly, the lateral position of the collector head is fixed relative to the track centerline. Consequently, the conductor stagger must not exceed some fraction of the width of the collector head. In contrast, an additional degree of freedom is incorporated into the construction of the tracking pantograph.

However, because the tracking pantograph apparatus must be fully compatible with the conventional catenary electrification system, no mechanical device is permissible to physically guide the collector head. Accordingly, the collector head of the tracking pantograph must be laterally positioned to maintain contact with the overhead conductor regardless of the degree of stagger without the use of physical restraints.

This objective is accomplished by incorporating an elbow-swivel assembly that permits the support arms to rotate about a vertical axis simultaneously with their rotation about a lateral axis to maintain contact with the conductor. So that the collector head can maintain contact with the overhead conductor regardless of the stagger of the overhead conductor, a means must be incorporated into the tracking pantograph that recognizes the lateral position of the collector head relative to the conductor. This is effected by providing contactors at opposing ends of the collector head.

When the overhead conductor touches either of these contactors, an electric circuit is completed, permitting an eror signal in the form of an electric current to control a servomechanical actuator that swivels the support arms in the appropriate direction to laterally displace the contactor from its position under the overhead conductor and thereby eliminate the error signal. Such servomechanical systems are widely used in industry and transportation for remote control and stabilization functions. Because lateral tracking does not involve physical force, no lateral loading is imposed on the overhead conductor, achieving result (a).

Because the tracking pantograph must be fully compatible with the conventional catenary electrification system, no special device in the overhead electrification system for the purpose of guiding the pantograph apparatus through turnouts is permissible. Regardless to which track the turnout is set, the overhead crossed-contact is placed in such a position in relation to the turnout to accommodate the movement of the collector head onto the appropriate overhead conductor. For this crossed-contact position to be independent of the direction the locomotive is facing as it passes through the turnout, the lateral and vertical movement of the collector head must have no longitudinal component. The apparatus as described produces essentially pure lateral and vertical displacement of the collector head, thereby achieving result (b).

Because the tracking pantograph must be fully compatible with the conventional catenary electrification system, the lateral and vertical mechanism of the tracking pantograph apparatus must be essentially independent of each other. Consequently, by centering and locking the collector head so as to preclude lateral displacement, vertical movement is not affected and the tracking pantograph operates as a conventional pantograph. The apparatus as described produces vertical displacement of the collector head independent of lateral displacement, thereby achieving result (c).

BRIEF DESCRIPTION OF THE DRAWINGS

FIG. 1A illustrates the side view of an electronically-tracking pantograph laterally centered.

FIG. 2 illustrates a cutaway view of the elbow-swivel assembly of an electronically-tracking pantograph.

FIG. 3A illustrates the side view of the collector and tracking head of an electronically-tracking pantograph.

FIG. 3B illustrates the top view of the collector and tracking head of an electronically-tracking pantograph.

FIG. 3C illustrates the side view of the collector and tracking head of an electronically-tracking pantograph.

Electrical leads and pneumatic lines are not shown on the drawings as such connections are known to those skilled in the art and their inclusion would only complicate the drawings.

PREFERRED EMBODIMENT OF THE INVENTION

To describe the operation of the tracking pantograph apparatus requires that certain reference axes be defined. The longitudinal axis is parallel to straight track or is tangent to curved track. The lateral axis is normal to the longitudinal axis and is defined by the height of the individual rails. Hence, it is not necessarily horizonal, as when the rails are superelevated. The vertical axis is orthogonal to the two defined axes, and consequently is not necessarily normal to the horizonal plane.

Figure 1B:
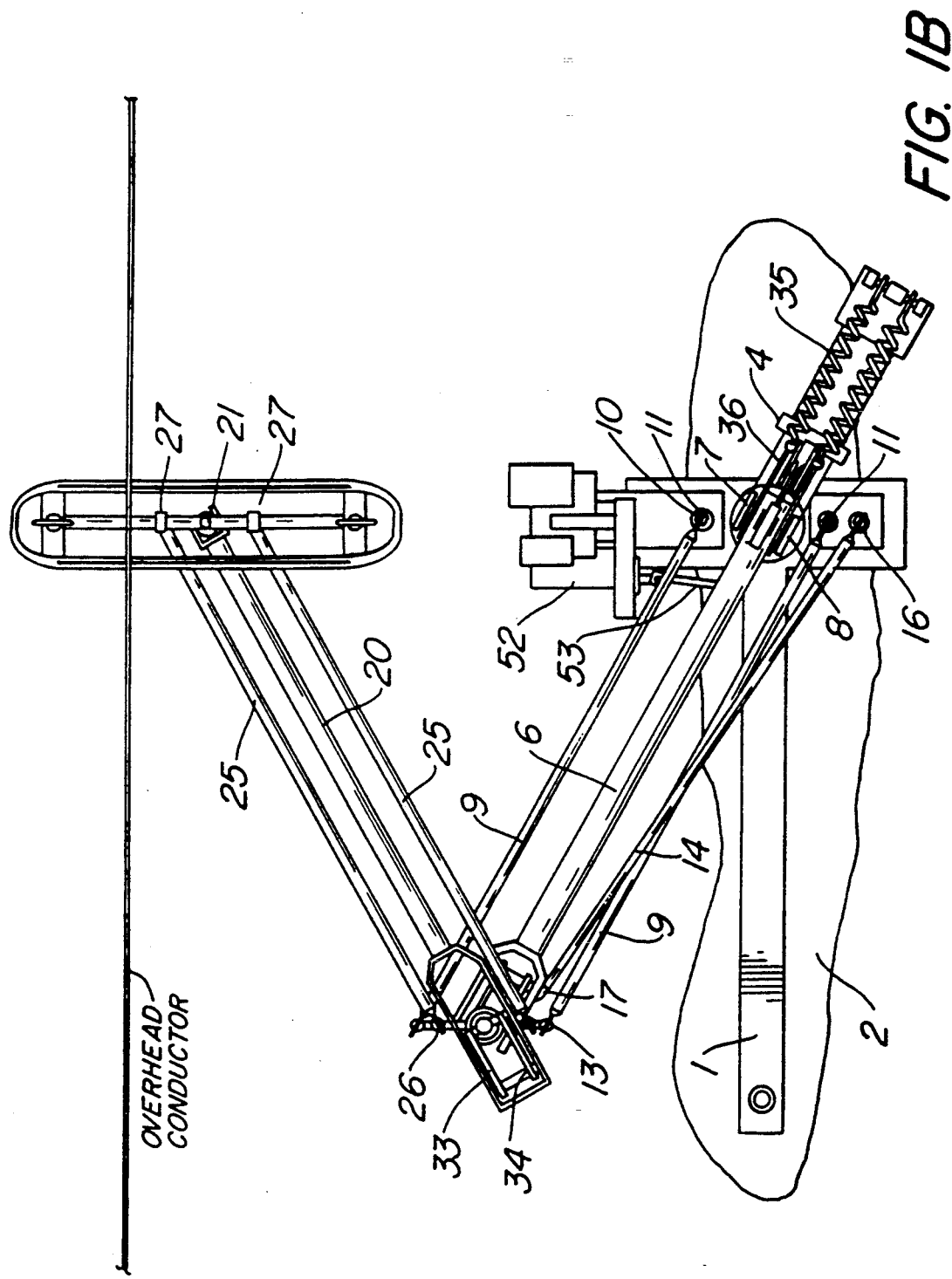
FIG. 1B illustrates the top view of an electronically-tracking pantograph displaced laterally from center.

FIGS. 1A and 1B illustrate side and top views respectively of the tracking pantograph apparatus. Base frame 1 of the pantograph apparatus is electrically isolated from the locomotive body 2 by insulators 3. Bracket 4 can swivel laterally about vertical shaft 5 rotatably secured to frame 1. The lower pantograph arm 6 pivots vertically about horizonal shaft 7 rotatably secured by member 8 to bracket 4. The parallel control rods 9 are secured by rod-end bearings 10 and consequently can swivel laterally and pivot vertically about shafts 11, which are secured to frame 1 and are laterally disposed in relation to shaft 5.

FIG. 2 illustrates a cutaway view of the elbow-swivel assembly. The elbow-swivel assembly comprises several concentric tubes rotatably secured to bearing members. To allow for the desired lateral displacement of the elbow-swivel assembly when bracket 4 is rotated about shaft 5 while maintaining the required orientation of the assembly, the lateral displacement of lower arm shaft 6 to that of control-rod pivots 10 is maintained at the elbow-swivel assembly by horizontal bearing shafts 12 and 13, which secure the ends of the lower arm 6 and control rods 9, respectively.

Because the control rods 9 have identical lengths between pivots and the pivots have equal lateral displacements, these members constitute a rhomboid linkage and consequently remain parallel independently of the vertical or lateral displacement of the elbow-swivel assembly. Moreover, because the vertical distance between the lower arm pivot shaft 7 and the control rod-end bearings 10 is maintained at the elbow-swivel assembly, the assembly remains essentially vertical independently of its vertical or lateral displacement and horizontal shaft 13 has a fixed lateral orientation.

The control rod 14 is secured by rod-end bearings 15 and can swivel laterally and pivot vertically about shaft 16, which is secured to frame 1 and is laterally disposed in relation to shafts 5 and 7. The elbow-swivel assembly control rod 14 is secured by rod-end bearing 17 to outer tube 18. Control rod 14 is not parallel to lower arm 6 because the lateral displacement of shaft 16 from shaft 5 on frame 1 is greater than their equivalent lateral displacement at the elbow-swivel assembly. Consequently, lower arm 6 and control rod 14 constitutes a trapezoid linkage. Accordingly, upon lateral rotation of arm 6 about shaft 5, control rod 14 rotates tube 18 about a vertical axis.

Elbow-swivel assembly shaft 19 is secured to tube 18. Because upper pantograph arm 20 is rotatably secured to shaft 19, rotation of tube 18 by control rod 14 has the effect of pivoting upper arm 20 through a lateral angle from the longitudinal axis essentially equal to the lateral angle that the lower arm 6 is pivoted from the longitudinal axis.

Accordingly, the included lateral angle between the upper arm and the longitudinal axis and the included lateral angle between the lower arms and the longitudinal axis are essentially equal. As a consequence of this rhomboid and trapezoid linkage arrangement, the axis of the elbow-swivel assembly remains vertical and therefore shaft 13 secured to vertical tube 13a remains aligned with the lateral axis regardless of the vertical or lateral displacement of the lower arm or the elbow-swivel assembly.

FIGS. 3A, 3B, and 3C illustrate the collector head. The collector head support 21 is fastened to collector head frame 22 and is rotatably secured to upper arm 20 at horizontal pivot 23 and vertical pivot 24. These angular motions are orthogonally constrained by control rods 25 secured at the elbow-swivel assembly by rod-end bearings to shaft 26 which is secured to tube 13a. At the collector head the control rods 25 are rotatably secured to the frame 22 by rod-end bearings at pivots 27. Because control rods 25 are laterally disposed and parallel to upper arm 20, they comprise a rhomboid linkage. Consequently the collector head frame 22 remains aligned with shaft 13a and therefore remains parallel to the lateral axis, maintaining the collector head essentially orthogonal to the overhead conductor independently of collector head displacement.

The vertical distance between horizonal bearing shafts 19 and 26 at the elbow-swivel assembly is maintained at the collector head between pivots 23 and 27. Because upper arm 20 and control rods 25 have equal lengths, collector head support shaft 21 is maintained parallel to the elbow-swivel assembly, and as the latter remains aligned with the vertical axis independently of its vertical or horizonal displacement, so must support shaft 21.

To provide the required vertical displacement of the collector head frame 22 independently of lateral displacement, the thrust rod 28 slides freely through elbow-swivel tube 13a which maintains the rod alignment. On opposite ends of rod 28 are secured horizonal bearing shafts 29 and 30. Lower linkage 31 is rotatably secured to lower arm 6 at pivot 32 and to rod 28 at horizonal bearing shaft 29. Similarly, upper linkage 33 is rotatably secured to upper arm 20 at pivot 34 and to thrust rod 28 at horizonal bearing shaft 30.

As lower arm 6 inclines upwards, the angle between arm 6 and horizonal bearing shaft 29 decreases, causing linkage 31 to impose a downward thrust on rod 28, which remains vertical. The resulting axial motion of rod 28 is transmitted to upper linkage 33 at horizonal bearing shaft 30 and thence to upper arm 20 at pivot 34. The downward motion of pivot 34 causes upper arm 20 to tilt upwards. Because linkages 31 and 33 are of equal length, and the distance between pivots 12 and 32 on lower arm 6 is equal to the distance between pivots 19 and 34 on upper arm 20, linkages 31 and 33 remain parallel and the vertical angle between lower arm 6 and the longitudinal axis is equal to the vertical angle between upper arm 20 and the longitudinal axis.

Accordingly, utilizing the elbow-swivel assembly, trapezoid linkage and rhomboid linkage, the vertical angle between the upper and lower pantograph arms respectively and the longitudinal axis are essentially equal, as are the lateral angle between the upper and lower pantograph arms respectively and the longitudinal axis. Consequently, the vertical and lateral displacement of the collector head is essentially free of any longitudinal component, thereby providing bidirectional operation. Moreover, because the vertical displacement mechanism does not comprise any active components involved in the lateral displacement mechanism, vertical and lateral collector-head motion are independent.

The necessary force required to extend the pantograph apparatus and maintain contact between the collector head and the overhead conductor independently of conductor sag is supplied by tension springs 35 through cables 36 secured to lower arm 6 at cams 37. Tension springs 35 are secured to the rear cylinder support of bracket 4. A pneumatic actuator is used to retract the pantograph apparatus as in conventional practice. The retraction cylinder 38, supported on the rear cylinder support and the forward cylinder support of bracket 4, actuates arm 39 by means of piston rod 40. Upon retraction arm 39 pivots about pivot 41 of forward cylinder support of bracket 4, moving linkage 42 against retraction arm 43 secured to lower arm 6, which forces arm 6 to pivot down.

The retraction mechanism does not interfere with normal operation of the pantograph apparatus because the slot in linkage 42 allows arm 6 to pivot over its entire range, and consequently only the tension of springs 35 is imposed on lower arm 6. This tension is transmitted through lower arm 6 and upper arm 20 to the collector head frame 22, and is resolved as a force imposed on the overhead conductor by conventional sliders 44 secured to collector head member 45. Sliders 44 are optimally composed of a low-friction electrically-conducting material.

Secured to opposite ends of collector frame 22 are conventional primary springbox assemblies each comprised of a cylindrical shell 46 closed at the bottom that guide slide rods 47. An upwards thrust on the slide rods 47 is imposed by a spring between the lower end of slide rods 47 and the bottom of shells 46. The upper end of slide rods 47 are secured to the bottom of cross-arms 48 that secure the collector head member 45. Hence the collect head member 45 is free to move vertically relative to the collector head frame 22.

Secured to but electrically insulated from the top of cross-arms 48 are secondary spring-box assemblies constructed identically to the conventional primary assemblies and comprised of shells 49 that guide slide rods 50. Rods 50 supports lateral contactors 51. Hence the lateral contactors 51 are free to move vertically relative to the the collector head member 45. The maximum potential difference between the contactors 51 and the collector head member 45 is only the nominal operating voltage of the tracking servosystem.

The lateral position of the collector head is properly maintained during normal operation when the overhead conductor is situated between the contactors 51. Because the lateral position of the contact wire relative to the track centerline is limited only by the physical reach of the tracking pantograph apparatus, the conductor will physically contact either of the contactors 51 as the wire meanders about the centerline. On contact the circuit is completed between the contactor 51 and the conventional servomechanical actuator 52.

The resultant electric signal locates the lateral position of the overhead conductor relative to the collector head and activates actuator 52, either extending or retracting linkage 53 rotatably secured to pivot arm 54. Arm 54 is secured to bracket 4. As a result bracket 4 swivels about vertical shaft 5 in the appropriate direction so that the lateral displacement of the collector head restores the conductor to its proper position between the contactors 51, thereby maintaining electric contact between the conductor and the collector head independently of conductor stagger.

Figure 4:
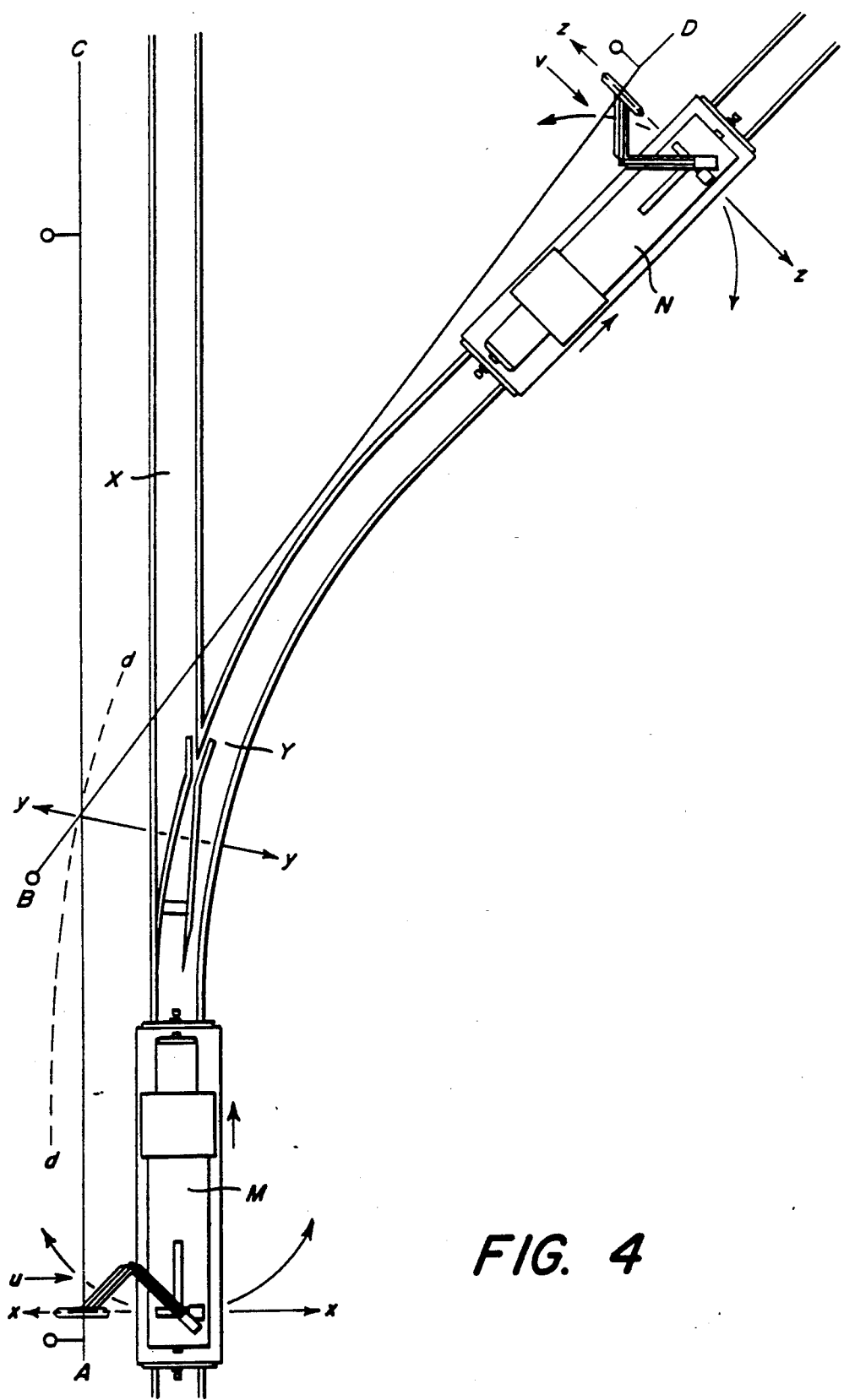
FIG. 4 illustrates the position of a crossed-contact conductor in relation to a turnout.

FIG. 4 illustrates the position for the overhead conductor relative to the track centerline in the vicinity of a turnout. Because the tracking pantograph apparatus can compensate for essentially any practical conductor stagger, the conductor is shown as a sidewire. This position will result in the most economical electrification construction, similar to that used for utility lines.

Because the tracking pantograph apparatus must be compatible with conventional catenary operation, no overhead switching device can be used to direct the pantograph through a turnout. A means of accomplishing this operation without such a device is as follows.

The dashed line d—d indicates the furthest lateral extent of the collector head if the tracking pantograph apparatus of locomotive M were extended to its lateral limit and the locomotive were to switch to the branchline Y. Under these conditions the tracking pantograph would follow mainline sidewire AC to position y—y at which point it would be physically pulled off of mainline sidewire AC onto branchline sidewire BD.

Evidently, the placement of position y—y is critical, as it must correspond to the physical point at which the collector head leaves the mainline sidewire. This placement is relatively simple to locate however because the tracking pantograph apparatus exhibits lateral motion with essentially no longitudinal component, shown as displacement x—x for locomotive M. The collector head will leave the mainline sidewire as locomotive M passes through the turnout when displacement x—x coincide with position y—y.

Alternately, for example, if the tracking pantograph apparatus did not exhibit purely lateral motion but instead followed a curved path in which there was a longitudinal component to the lateral motion, then the point u of locomotive M would determine the point at which the collector head leaves the mainline sidewire.

Consider now locomotive N, which has already passed through the turnout, whose collector head also follows purely lateral displacement z—z. Note that although both locomotives are traveling in the same direction, they are facing in opposite directions. Therefore position u of locomotive M leads displacement x—x, while for locomotive N position v (which corresponds to position u of locomotive M if a longitudinal displacement is present), lags behind purely lateral displacement z—z.

Accordingly, position y—y must be located differently in relation to the turnout for these two locomotives if a longitudinal component of lateral displacement of the collector head was present. However such differential positioning is not possible because position y—y is physically fixed. Consequently, essentially no longitudinal component of lateral collector head motion can be allowed, resulting in a bidirectional tracking pantograph apparatus.

To accommodate locomotives passing through the turnout from the branchline to the mainline the sidewire BD is located immediately above the sidewire AC at the cross-contact position y—y. Consequently, the collector head simply moves from the branchline sidewire onto the mainline sidewire, which then controls the lateral position of the collector head.

While it might appear that upon abrupt changes in direction of the overhead conductor at support stanchions an abrupt reversal of the lateral motion of the collector head is required to maintain contact, this is not the case. Any abrupt change in the direction of the overhead conductor simply results in the wire sliding across the collector head to the opposite contactor. Rapid servomechanical reversals with the high inertial stresses they can imposed on the pantograph structure cannot occur.

Sidewire electrification will result in the most economical means of construction, similar to that used for utility lines. Considering again the hypothetical 60 km (37 mi) branchline previously discussed. With sidewire construction 70 m (230 ft) spacing can be maintained between stanchions on curved track as well as tangent so that only 860 poles are required instead of roughly 1000. Although a distributor wire will be required to compensate for the current carrying capacity lost in eliminating the messenger wire, the distributor is strung in the manner of utility lines without the need for tens of thousands of hangers.

Probably the greatest restriction on using the tracking pantograph apparatus at operating speeds higher than those discussed is overhead conductor sag rather than stagger. However, with the same line tension sag is proportional to conductor density, so that directly substituting aluminum conductor for copper conductor will minimize sag, with a heavier distributor line required to compensate for the resultant lower conductivity. Operating experience has proven the feasibility of aluminum conductors for railway electrification.

While there have been described what are at present considered to be the preferred embodiments of a tracking pantograph apparatus, it will be obvious to those skilled in the art that various changes and modifications may be made therein without departing from the invention, and it is aimed therefore in the appended claims to cover all such changes and modifications as fall within the true spirit and scope of the invention.

What is claimed is:

1. A pantograph apparatus secured to the roof of an electric locomotive, for collecting power from an overhead electrified conductor; wherein said apparatus comprises:
    a base secured to said roof of said locomotive;
    a trapezoid linkage assembly having first and second ends, wherein said first end is rotatably secured to said base;
    an elbow-swivel assembly having first and second arms and allowing only pivotal movement in one-dimension between said first and second arms and wherein one of the said two arms is connected to said second end of said trapezoid linkage assembly;
    a rhomboid linkage assembly having first and second ends, wherein said first end of said rhomboid linkage assembly is connected to the other end of said two arms of said elbow-swivel assembly, thereby allowing only pivotal movement in one-dimension between said trapezoidal linkage assembly and said rhomboid linkage assembly;
    a collector head connected to said second end of said rhomboid linkage assembly, and wherein;
    said locomotive travels in a longitudinal direction and there exists a vertical direction pointing essentially directly above said locomotive and there exists a lateral direction pointing from said locomotive and being substantially perpendicular to both said longitudinal direction and said vertical direction, and wherein;
    said trapezoid-linkage assembly constitutes a lower pantograph arm and includes means to maintain said collector head at substantially a same longitudinal position relative to said base regardless of a change in a lateral position of said collector head relative to said base, and
    said elbow-swivel assembly includes means to maintain said collector head at substantially a same longitudinal position relative to said base regardless of a change in a vertical position of said collector head relative to said base, and
    said rhomboid linkage assembly constitutes an upper pantograph arm and includes means to maintain said collector head orientated substantially parallel to said lateral direction regardless of changes in a lateral or a vertical position of said collector head relative to said base.

2. A pantograph apparatus according to claim 1 wherein a vertical collector-head displacement thrust rod of said elbow-swivel assembly is an active component, and is not associated with said trapezoid linkage nor said rhomboid linkage;
    thereby providing vertical collector-head motion independent of said lateral collector-head position or said lateral collector-head orientation.

3. A pantograph apparatus according to claim 1 wherein first control rods comprising said trapezoid linkage are active components and are not associated with said rhomboid linkage nor said elbow-swivel assembly;
    thereby providing lateral collector-head motion independent of said collector-head orientation or said collector-head vertical position.

4. A pantograph apparatus according to claim 1 wherein second control rods comprising said rhomboid linkage are active components and are not associated with said elbow-swivel assembly nor said trapezoidal linkage;
    thereby providing lateral collector-head orientation independent of said vertical collector-head position or said lateral collector-head position.

5. A pantograph apparatus according to claim 2 wherein the angle of vertical pivot between said longitudinal direction and said lower pantograph arm and the angle of vertical pivot between said longitudinal direction and said upper pantograph arm are maintained essentially equal by the thrust rod of said elbow-swivel assembly, the vertical angular relationship between said lower pantograph arm and said upper pantograph arm is provided by said elbow-swivel assembly independently of the lateral swivel of said lower and said upper pantograph arms;
    thereby essentially eliminating said longitudinal component of vertical displacement of said collector head.

6. A pantograph apparatus according to claim 3 wherein the angle of lateral swivel between said longitudinal direction and said lower pantograph arm and the angle of lateral swivel between said longitudinal direction and said upper pantograph arm are maintained essentially equal by the first control rods of said trapezoid linkage, the lateral angular relationship between said lower pantograph arm and said upper pantograph arm is provided by said trapezoid linkage independently of the vertical pivot of said lower and said upper pantograph arms;
    thereby essentially eliminating said longitudinal component of lateral displacement of said collector head.

7. A pantograph apparatus according to claim 1 provided with two contactors, one positioned at opposite lateral ends of said collector head;

wherein physical contact between said overhead conductor and either of said contactors completing an electric circuit indicative of said contactor being physically contacted;

wherein said electric circuit connects to a servomechanical actuator linked by an extending or retracting linkage to a pivot arm secured to a vertical shaft upon which is rotatably secured said lower pantograph arm, completion of said circuit activating said servomechanical actuator so as to laterally swivel said lower pantograph arm by means of said extending or retracting linkage;

thereby laterally displacing said collector head by said rhomboid linkage so as to maintain said overhead conductor between said contactors independently of stagger of said overhead conductor.

* * * * *